(12) United States Patent
Koester

(10) Patent No.: US 12,018,474 B2
(45) Date of Patent: Jun. 25, 2024

(54) CORNER SUPPORT ASSEMBLY AND METHOD FOR INSTALLING SAME

(71) Applicant: John H. Koester, Payson, AZ (US)

(72) Inventor: John H. Koester, Payson, AZ (US)

( * ) Notice: Subject to any disclaimer, the term of this patent is extended or adjusted under 35 U.S.C. 154(b) by 16 days.

(21) Appl. No.: 17/695,525

(22) Filed: Mar. 15, 2022

(65) Prior Publication Data

US 2022/0298778 A1 Sep. 22, 2022

Related U.S. Application Data

(60) Provisional application No. 63/164,291, filed on Mar. 22, 2021.

(51) Int. Cl.
 *E04B 2/00* (2006.01)
 *E04B 1/38* (2006.01)
 *E04B 1/76* (2006.01)

(52) U.S. Cl.
 CPC ............ *E04B 1/388* (2023.08); *E04B 1/7629* (2013.01); *E04B 2001/389* (2023.08)

(58) Field of Classification Search
 CPC ................................ E04B 1/40; E04B 1/7629
 See application file for complete search history.

(56) References Cited

U.S. PATENT DOCUMENTS

| | | | | |
|---|---|---|---|---|
| 963,776 A * | 7/1910 | Kosack | ................. | E04B 2/8652 52/285.3 |
| 2,029,082 A * | 1/1936 | Odam | ................... | E04B 1/4185 52/564 |
| 3,722,166 A * | 3/1973 | McNerney | ............ | E04F 19/064 52/509 |
| 3,888,087 A | 6/1975 | Bergsland | | |
| 3,989,397 A * | 11/1976 | Baker | ..................... | F16B 12/02 403/231 |
| 4,177,617 A * | 12/1979 | DeLuca | .................... | E04B 2/28 52/565 |
| 4,766,710 A * | 8/1988 | Tompkins | ........... | E04F 13/0736 52/278 |
| 5,520,477 A * | 5/1996 | Fink | ...................... | F16B 5/0028 403/231 |
| 5,658,483 A * | 8/1997 | Boeshart | ............... | E04G 17/001 403/402 |

(Continued)

FOREIGN PATENT DOCUMENTS

FR 2555226 A1 5/1985

OTHER PUBLICATIONS

Extended European Search Report (EESR), dated Sep. 19, 2022, 9 pages, Sally Arsac England.

(Continued)

*Primary Examiner* — Basil S Katcheves
(74) *Attorney, Agent, or Firm* — Dicke, Billig & Czaja, PLLC

(57) ABSTRACT

A corner support assembly comprises a first portion and a second portion. The first portion has a first flange configured and arranged to be connected to a corner. The second portion has a second flange. The second portion is operatively connected to the first portion, and the second portion is configured and arranged to be adjustable relative to the first portion to vary a distance between the first and second flanges of the first and second portions to accommodate varying thicknesses of different types of insulation between the first and second flanges.

16 Claims, 4 Drawing Sheets

(56) References Cited

U.S. PATENT DOCUMENTS

| | | | | |
|---|---|---|---|---|
| 5,782,050 | A * | 7/1998 | Boeshart | E04G 17/001 249/40 |
| 5,992,114 | A * | 11/1999 | Zelinsky | E04B 2/8652 249/34 |
| 6,250,033 | B1 * | 6/2001 | Zelinsky | E04B 2/8652 52/275 |
| 6,470,638 | B1 | 10/2002 | Larson | |
| 6,519,906 | B2 * | 2/2003 | Yost | E04B 2/8635 52/564 |
| 6,758,017 | B2 * | 7/2004 | Young | E04F 19/022 52/287.1 |
| 6,826,880 | B2 * | 12/2004 | Yost | E04B 2/8635 52/428 |
| 6,964,136 | B2 | 11/2005 | Collins et al. | |
| 7,861,479 | B2 * | 1/2011 | Crosby | E04B 2/8617 52/428 |
| D661,817 | S * | 6/2012 | Fournier | D25/102 |
| 8,458,973 | B1 * | 6/2013 | Powers, Jr. | E04C 3/20 52/432 |
| 9,217,277 | B2 | 12/2015 | Hans | |
| 9,540,808 | B2 | 1/2017 | Remmele | |
| D798,154 | S * | 9/2017 | D'Anglade | D9/456 |
| 10,858,167 | B2 * | 12/2020 | D'Anglade | B65D 71/0096 |
| 11,077,986 | B2 * | 8/2021 | Fry | B65B 35/50 |
| 2001/0047632 | A1 * | 12/2001 | Yost | E04B 2/8635 52/631 |
| 2012/0060349 | A1 | 3/2012 | Williams | |
| 2013/0255178 | A1 * | 10/2013 | Judd | E04B 1/40 52/646 |
| 2016/0097193 | A1 * | 4/2016 | Lafontaine Berger | E04B 1/40 52/579 |
| 2019/0119904 | A1 * | 4/2019 | Sultan | E04B 1/40 |
| 2019/0153727 | A1 * | 5/2019 | Stahl, Jr. | E04B 2/825 |
| 2020/0340238 | A1 | 10/2020 | Johnson | |

OTHER PUBLICATIONS

Amico; Hydrodry Moisture Management Solution brochure; known of prior to filing date (2020); www.amicobp.com; 8 pages.

John H. Koester and Tyler Leclear Vachta—Masonry Technology Inc.; Avoiding the Stucco Bucket at Overhands and Insets; Nov. 2018; 4 pages.

* cited by examiner

US 12,018,474 B2

CORNER SUPPORT ASSEMBLY AND METHOD FOR INSTALLING SAME

CROSS-REFERENCE TO RELATED APPLICATIONS

This application claims the benefit of U.S. Provisional Patent Application Ser. No. 63/164,291, filed Mar. 22, 2021, which is incorporated by reference in its entirety herein.

BACKGROUND

Building veneers including varying types of outboard rigid insulation, such as mineral or rock wool made from rock and blast furnace slag and extruded or expanded polystyrene, are commonly used in construction of buildings. For applications of varying types of veneers, securing the veneer to corners can be challenging, especially because of varying thicknesses of different types of insulation.

For the reasons stated above and for other reasons stated below, which will become apparent to those skilled in the art upon reading and understanding the present specification, there is a need in the art for a corner support assembly.

SUMMARY

The above-mentioned problems associated with prior devices are addressed by embodiments of the disclosure and will be understood by reading and understanding the present specification. The following summary is made by way of example and not by way of limitation. It is merely provided to aid in understanding some of the aspects of the invention.

In one embodiment, a corner support assembly comprises a first portion and a second portion. The first portion has a first flange configured and arranged to be connected to a corner. The second portion has a second flange. The second portion is operatively connected to the first portion, and the second portion is configured and arranged to be adjustable relative to the first portion to vary a distance between the first and second flanges of the first and second portions to accommodate varying thicknesses of different types of insulation between the first and second flanges.

In one embodiment, a method of connecting veneer to a corner of a structure comprises providing veneer having an insulation thickness; providing a corner support assembly comprising a first portion having a first flange configured and arranged to be connected to a corner and a second portion having a second flange, the second portion being operatively connected to the first portion, the second portion being configured and arranged to be adjustable relative to the first portion to vary a distance between the first and second flanges of the first and second portions to accommodate varying thicknesses of different types of insulation between the first and second flanges; connecting the first flange to the corner of the structure; adjusting the distance between the first and second flanges to accommodate the insulation thickness; positioning the insulation between the first and second flanges; and connecting the second flange to the veneer.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. In accordance with common practice, the various described features are not drawn to scale but are drawn to emphasize specific features relevant to the present disclosure. Reference characters denote like elements throughout the Figures and the text.

DETAILED DESCRIPTION

Figure 1:
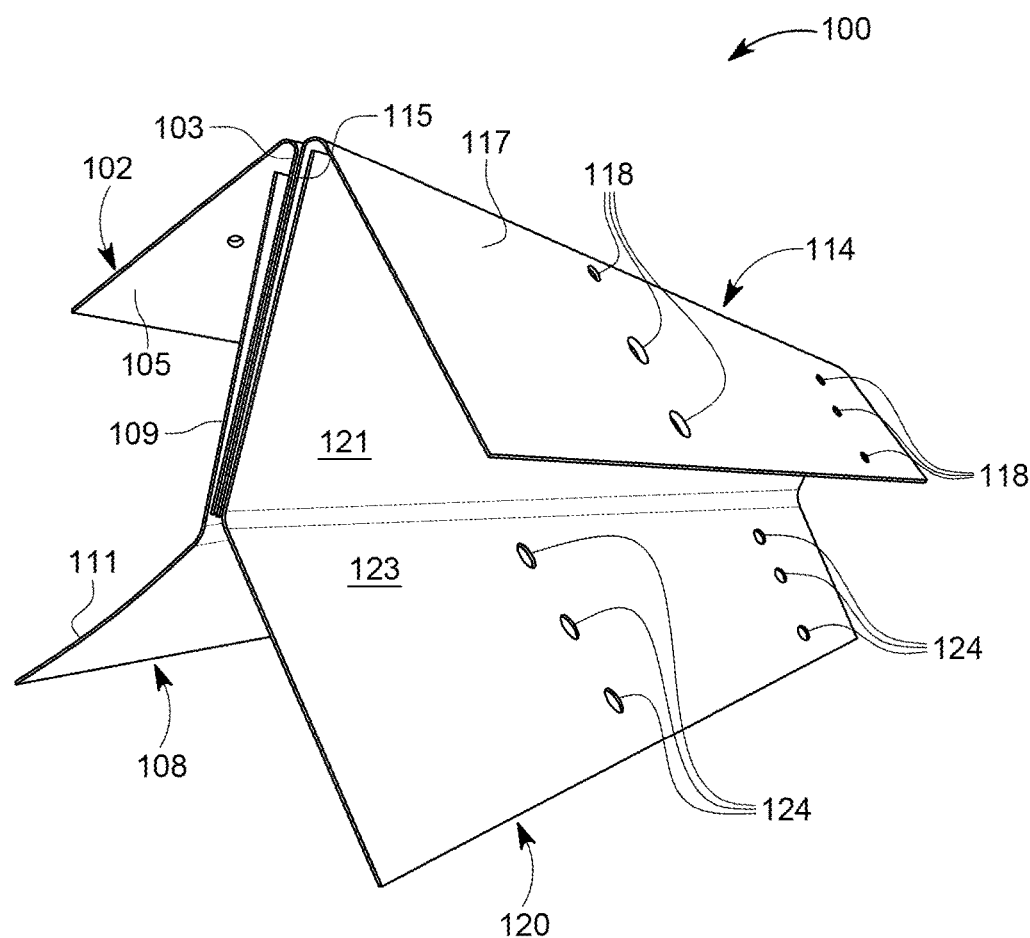
FIG. 1 is a top perspective view of an embodiment corner support assembly constructed in accordance with the principles of the present invention.

In the following detailed description, reference is made to the accompanying drawings, which form a part hereof, and in which is shown by way of illustration embodiments in which the disclosure may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that other embodiments may be utilized and mechanical changes may be made without departing from the spirit and scope of the present disclosure. The following detailed description is, therefore, not to be taken in a limiting sense.

Embodiments of the disclosure generally provide a corner support assembly including a first portion having a first flange and a second portion having a second flange. The first flange is configured and arranged to be connected to a corner. For an inside corner, the first flange is configured and arranged to fit in the inside corner and the second flange forms an inside corner. For an outside corner, the first flange is configured and arranged to fit on the outside corner and the second flange forms an outside corner. The second portion is operatively connected to the first portion and is configured and arranged to be adjustable relative to the first portion to vary a distance between the first and second flanges of the first and second portions. For example, at least one of the first and second portions can have a slot through which a fastener extends to allow for adjustment of the distance between the first and second flanges. The ability to adjust the distance between the first and second flanges allows for accommodation of varying thicknesses of different types of insulation to be used with the corner support assembly. Therefore, only one corner support assembly is needed regardless of the type of veneer used. Generally, the veneer can include sheathing, weather resistive barrier, insulation, and a stucco or other suitable coating. The first and second flanges are configured and arranged to receive the insulation, and the second flange is configured and arranged to be connected to the veneer. The corner support assembly is preferably a length corresponding with the length of the corner, but it is recognized that any suitable number of assemblies can be used.

To achieve fire resistant or fire proof ratings, the corner support assembly is preferably made of metal and the insulation is preferably made of a fire resistant or fire proof material such as mineral or rock wool. Preferably, stainless steel is used to resist corrosion of the corner support assembly.

Figure 2:
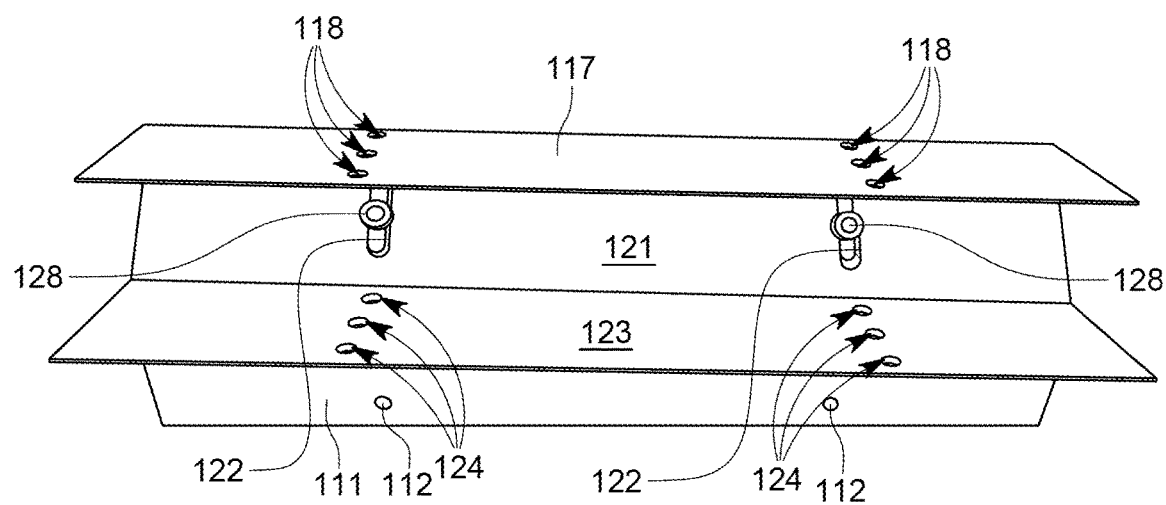
FIG. 2 is a side view of the corner support assembly shown in FIG. 1.

In one embodiment, illustrated in FIGS. 1 and 2, a corner support assembly 100 includes a first portion and a second portion. The first portion is formed by a first member 102 and a third member 114. The first member 102 is an elongate, generally L-shaped member having a first inner leg 103 and a first outer leg 105. The third member 114 is an elongate, generally L-shaped member having a third inner leg 115 and a third outer leg 117. The first outer leg 105 and the third outer leg 117 form a first flange configured and arranged to correspond with the angle of the corner. The second portion is formed by a second member 108 and a fourth member 120. The second member 108 is an elongate, generally L-shaped member having a second inner leg 109 and a second outer leg 111. The fourth member 120 is an elongate, generally L-shaped member having a fourth inner leg 121 and a fourth outer leg 123. The second outer leg 111 and the fourth outer leg 123 form a second flange preferably configured and arranged to correspond with the angle of the corner and the first flange.

In this embodiment, the first and third inner legs 103 and 115 are sandwiched between the second and fourth inner legs 109 and 121, but it is recognized that any suitable arrangement of these legs can be used. The at least one of the first and third inner legs 103 and 115 and the second and fourth inner legs 109 and 121 include slots. For example, the first and third inner legs 103 and 115 can include apertures (not shown) and the second and fourth inner legs 109 and 121 can include slots (e.g., slots 122 of the fourth inner leg 121) through which a fastener extends to allow for adjustment of the distance between the flanges. Alternatively, the first and third inner legs 103 and 115 can include slots and the second and fourth inner legs 109 and 121 can include apertures. Alternatively, both the first and third inner legs 103 and 115 and the second and fourth inner legs 109 and 121 can include slots. The apertures and/or slots are at least partially aligned, and a fastener 128 extends through the apertures and/or slots. When the fastener is not secured or is not tightly secured to the inner legs, the distance between the first and second flanges is adjustable.

The outer legs preferably include apertures through which fasteners are inserted to connect the flanges to the respective corner and veneer. For example, as shown in FIGS. 1 and 2, the third outer leg 117 includes apertures 118 and the fourth outer leg 123 includes apertures 124.

Figure 3A:
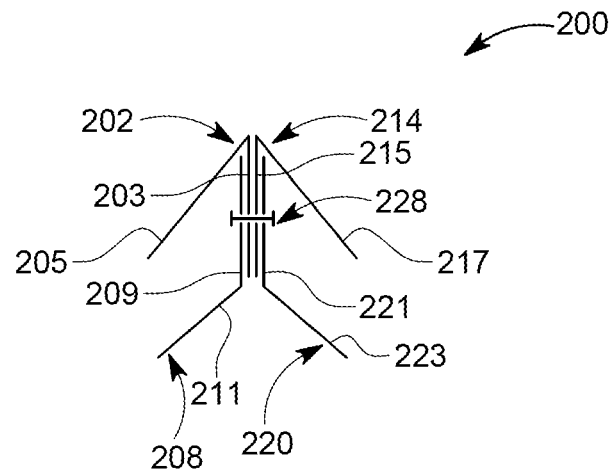
FIG. 3a is a schematic view of another embodiment corner support assembly constructed in accordance with the principles of the present invention.

In one embodiment, illustrated in FIG. 3a, a corner support assembly 200 includes a first member 202 and a third member 214 forming a first portion and a second member 208 and a fourth member 120 forming a second portion. The first member 202 is an elongate, generally L-shaped member having a first inner leg 203 and a first outer leg 205, which can vary in length and, in this example, are each preferably 1.5 to 2.5 inches long (laterally) and form an angle of approximately 45 degrees if used with a corner having an angle of approximately 90 degrees. The third member 214 is an elongate, generally L-shaped member having a third inner leg 215 and a third outer leg 217, which can vary in length and, in this example, are each preferably 1.5 to 2.5 inches long (laterally) and form an angle of approximately 45 degrees if used with a corner having an angle of approximately 90 degrees. The first outer leg 205 and the third outer leg 217 form a first flange configured and arranged to correspond with the angle of the corner. The second member 208 is an elongate, generally L-shaped member having a second inner leg 209 and a second outer leg 211, which can vary in length and, in this example, are preferably 1.5 to 2.5 inches long (laterally) and form an angle of approximately 135 degrees if used with a corner having an angle of approximately 90 degrees. The fourth member 220 is an elongate, generally L-shaped member having a fourth inner leg 221 and a fourth outer leg 223, which can vary in length and, in this example, are preferably 1.5 to 2.5 inches long (laterally) and form an angle of approximately 135 degrees if used with a corner having an angle of approximately 90 degrees. The second outer leg 211 and the fourth outer leg 223 form a second flange preferably configured and arranged to correspond with the angle of the corner and the first flange. The first, second, third, and fourth outer legs 205, 211, 217, and 223 include apertures, preferably 2-3 laterally aligned, spaced approximately 6.0 inches apart longitudinally to receive fasteners for securing the outer legs to the corner and the veneer.

In this embodiment, a first inside surface of the first inner leg 203 is positioned adjacent a third inside surface of the third inner leg 215, a second inside surface of the second inner leg 209 is positioned adjacent a first outside surface of the first inner leg 203, and a fourth inside surface of the fourth inner leg 221 is positioned adjacent a second outside surface of the second inner leg 209. In this embodiment, the first, second, third, and fourth inner legs 203, 209, 215, and 221 include slots, and the slots are at least partially aligned to form an aperture configured and arranged to receive a fastener 228. Although the dimensions of the slots can vary, in this example, the slots are preferably 1.0 to 1.5 inches long (laterally) and are spaced approximately 6.0 inches apart longitudinally. Although slots are shown in this embodiment, it is recognized that a suitable combination of apertures and/or slots, as described above, can be used. The second and fourth inner legs 209 and 221 are slidable relative to the first and third inner legs 203 and 209 when the fastener 228 is unsecured to allow movement of the second portion relative to the first portion. The assembly 200 can be any suitable longitudinal length, but it is preferred to use 8.0 feet long sections, and one or more sections can be used on each building corner.

Figure 3B:
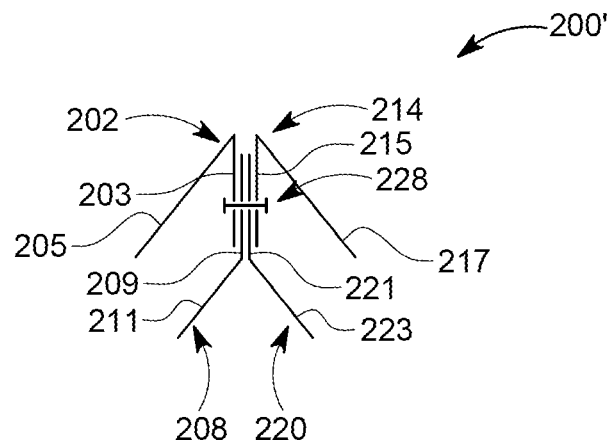
FIG. 3b is a schematic view of another embodiment corner support assembly constructed in accordance with the principles of the present invention.

FIG. 3b is similar to FIG. 3a but the components are arranged differently as corner support assembly 200'. Therefore, only the arrangement of the components is being described. In this embodiment, a second inside surface of the second inner leg 209 is positioned adjacent a fourth inside surface of the fourth inner leg 221, a first inside surface of the first inner leg 203 is positioned adjacent a second outside surface of the second inner leg 209, and a third inside surface of the third inner leg 215 is positioned adjacent a fourth outside surface of the fourth inner leg 221.

Figure 3C:
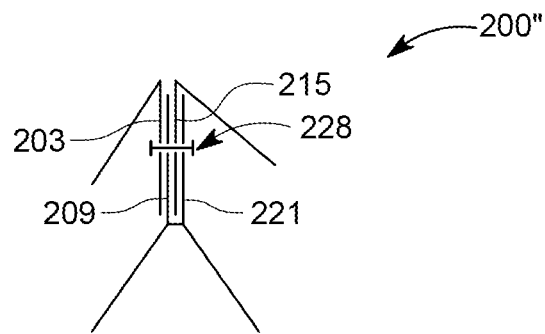
FIG. 3c is a schematic view of another embodiment corner support assembly constructed in accordance with the principles of the present invention.

FIG. 3c is similar to FIGS. 3a and 3b but the components are arranged differently as corner support assembly 200″. In this embodiment, the inner legs 203, 209, 215, and 221 alternate, as shown.

Figure 4:
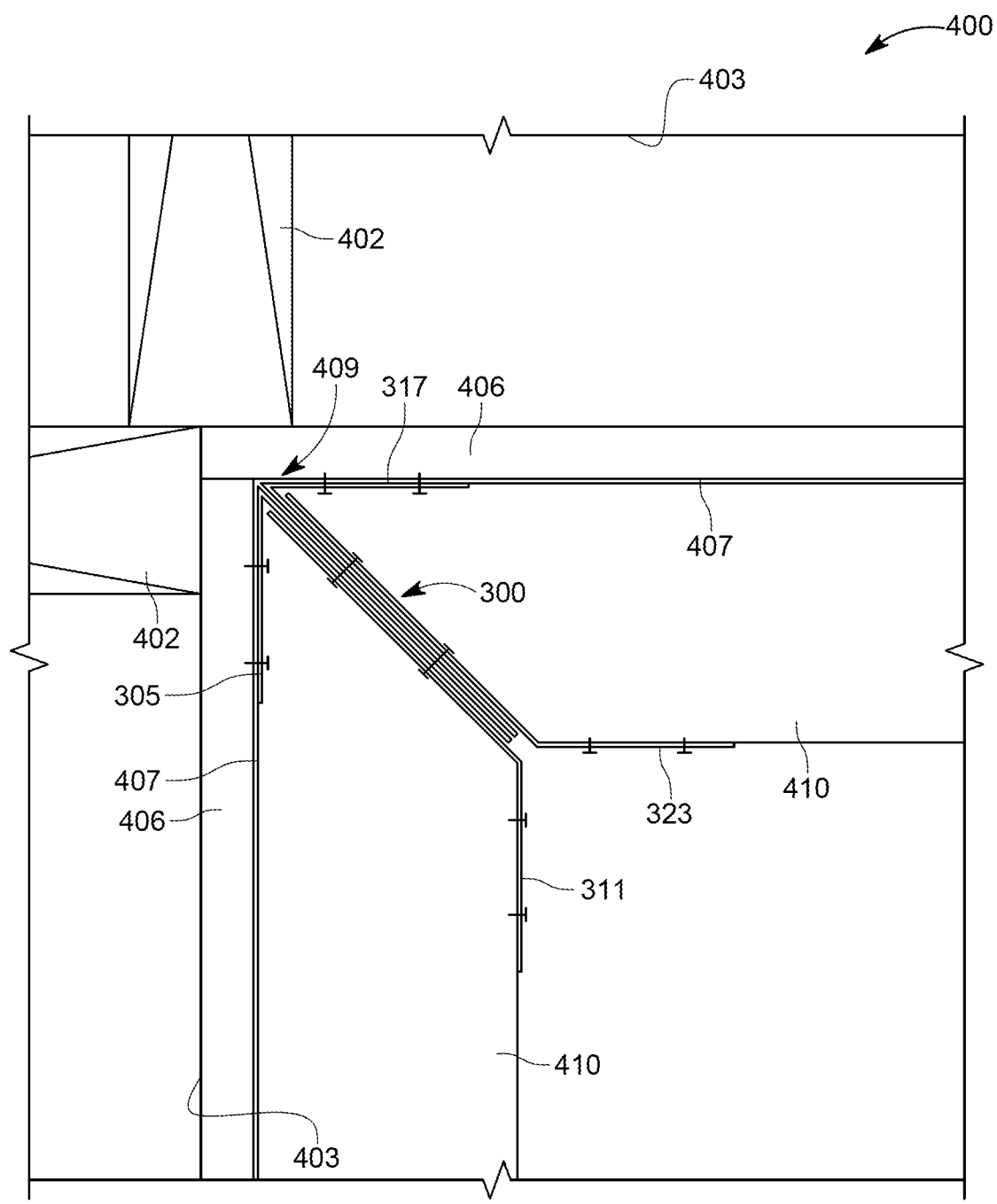
FIG. 4 is a schematic view of another embodiment corner support assembly constructed in accordance with the principles of the present invention operatively connected to an inside corner assembly.
Figure 5:
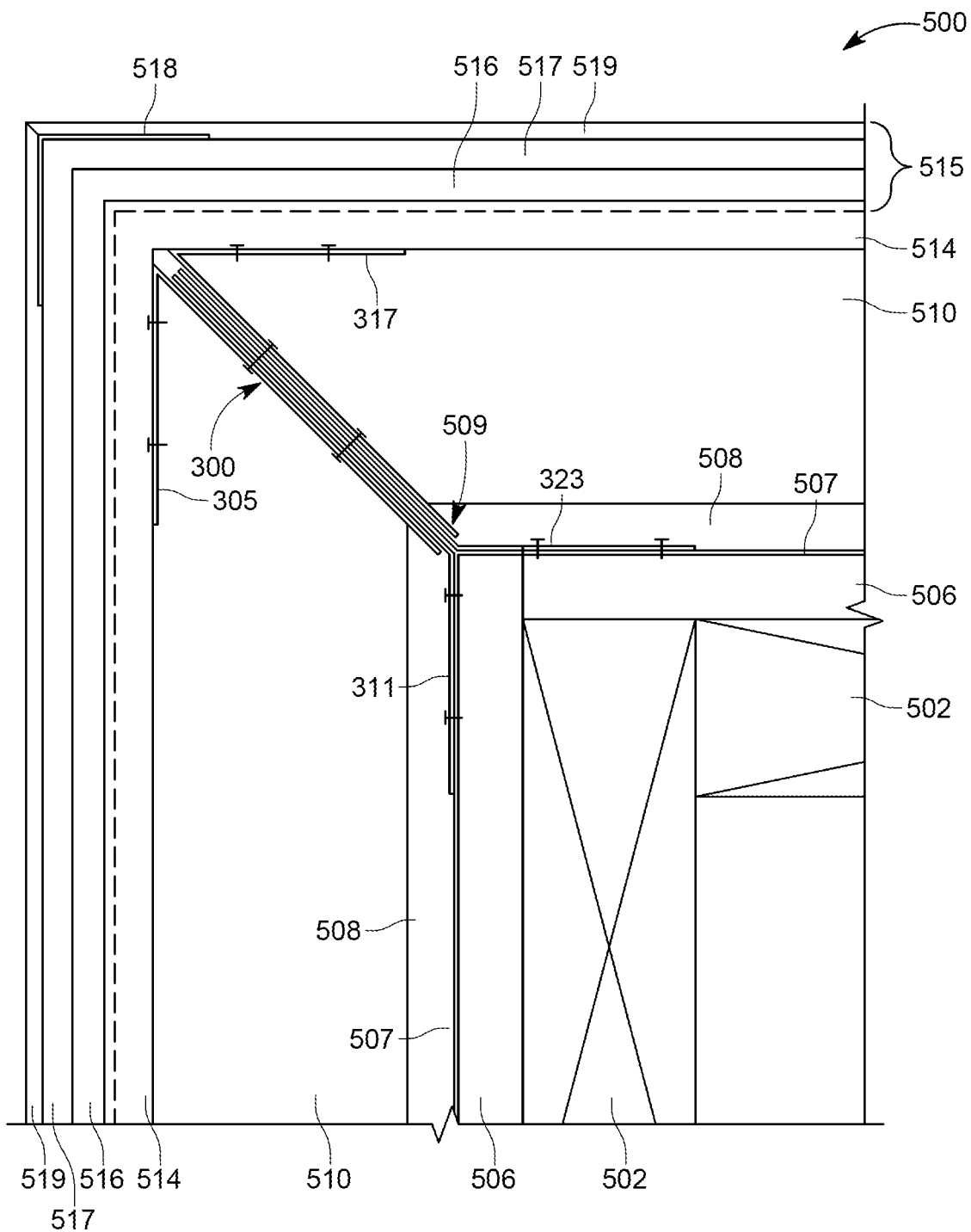
FIG. 5 is a schematic view of the corner support assembly shown in FIG. 4 operatively connected to an outside corner assembly.

FIG. 4 illustrates a corner support assembly 300 connected to an inside corner assembly 400 forming a corner 409. Corner support assembly 300 is shown schematically and can be any suitable embodiment. Generally, the inside corner assembly 400 includes studs 402, insulated stud cavities 403, and part of a veneer including sheathing 406 and weather resistant barrier (WRB) 407 forming the corner 409. Examples of sheathing 406 can be exterior gypsum, plywood, oriented strand board (OSB), or other suitable sheathing. The first portion of the corner support assembly 300 is connected to the corner 409 by inserting fasteners through the outer legs 305 and 317, through the WRB 407, and into the sheathing 406. The insulation of the veneer is then installed. The distance between the first and second flanges is adjusted to accommodate the thickness of the insulation 410. Then, after the insulation is positioned between the first and second flanges, fasteners are inserted through the outer legs 311 and 323 into the insulation 410. Additional veneer components, such as those illustrated in FIG. 5, are then installed over the outer legs 311 and 323 and the insulation 410 as is well known in the art. Although a three coat stucco system is shown in FIG. 5, it is recognized that any suitable envelope system can be used.

FIG. 5 illustrates the corner support assembly 300 connected to an outside corner assembly 500 forming a corner 509. Generally, the outside corner assembly 500 includes studs 502, insulated stud cavities (not shown), and part of a veneer including sheathing 506 and WRB 507 forming the corner 509. The first portion of the corner support assembly 300 is connected to the corner 509 by inserting fasteners through the outer legs 311 and 323, through the WRB 507, and into the sheathing 506. In this example, the first portion is the second portion of the example shown in FIG. 4 and the second portion is the first portion of the example shown in FIG. 4. A filter screen and drainage plane 508 component of the veneer is positioned on the outer legs 311 and 323 and the WRB 507. The distance between the first and second flanges is adjusted to accommodate the thickness of the filter screen and drainage plane 508 and the insulation 510. Then, after the insulation 510 is positioned between the first and second flanges, fasteners are inserted through the outer legs 511 and 523 into the insulation 510. A filter screen and drainage plane 514 is positioned on the outer legs 305 and 317 and the insulation 510, and then a three coat stucco system 515, including a metal corner 518, is installed as is known in the art. Although a three coat stucco system is shown, it is recognized that any suitable envelope system can be used.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A corner support assembly, comprising:
    a first portion having a first flange configured and arranged to be connected to a corner and a first leg extending from the first flange; and
    a second portion having a second flange and a second leg extending from the second flange, the second leg being directly sidably connected to the first leg, the second portion being configured and arranged to be adjustable relative to the first portion by moving the second leg relative to the first leg to vary a length forward formed by the first and second legs between the first and second flanges of the first and second portions to accommodate varying thicknesses of different types of insulation positioned between the first and second flanges, wherein the first and second legs include slots, the slots being at least partially aligned to form an aperture configured and arranged to receive a fastener.

2. The corner support assembly of claim 1, wherein the first portion is configured and arranged to fit in a first inside corner of a structure, the second portion forming a second inside corner.

3. The corner support assembly of claim 1, wherein the second portion is configured and arranged to fit on a first outside corner of a structure, the first portion forming a second outside corner.

4. The corner support assembly of claim 1, wherein the first portion includes a first member having a first inner leg and a first outer leg and a third member having a third inner leg and a third outer leg, the first flange being formed by the first outer leg and the third outer leg, the first leg being formed by the first inner leg and the third inner leg, wherein the second portion includes a second member having a second inner leg and a second outer leg and a fourth member having a fourth inner leg and a fourth outer leg, the second flange being formed by the second outer leg and the fourth outer leg, the second leg being formed by the second inner leg and the fourth inner leg.

5. The corner support assembly of claim 4, wherein the first, second, third, and fourth outer legs include apertures, each aperture configured and arranged to receive a fastener.

6. The corner support assembly of claim 4, wherein a second inside surface of the second inner leg is positioned adjacent a fourth inside surface of the fourth inner leg, a first inside surface of the first inner leg is positioned adjacent a second outside surface of the second inner leg, and a third inside surface of the third inner leg is positioned adjacent a fourth outside surface of the fourth inner leg.

7. The corner support assembly of claim 6, wherein the first, second, third, and fourth inner legs include inner slots, the inner slots being at least partially aligned to form an aperture configured and arranged to receive a fastener.

8. The corner support assembly of claim 7, wherein the second and fourth inner legs are slidable relative to the first and third inner legs when the fastener is unsecured to allow movement of the second portion relative to the first portion.

9. The corner support assembly of claim 1, wherein at least one of the first and second legs has a slot through which a fastener extends to allow adjustment of the distance between the first and second flanges.

10. The corner support assembly of claim 1, wherein the first and second portions are made of metal.

11. A corner support assembly, comprising:
    a first portion having a first flange configured and arranged to be connected to a corner;
    a second portion having a second flange, the second portion being operatively connected to the first portion, the second portion being configured and arranged to be adjustable relative to the first portion to vary a distance between the first and second flanges of the first and second portions to accommodate varying thicknesses of different types of insulation between the first and second flanges; and wherein the first portion includes a first member having a first inner leg and a first outer leg and a third member having a third inner leg and a third outer leg, the first flange being formed by the first outer leg and the third outer leg, wherein the second portion includes a second member having a second inner leg and a second outer leg and a fourth member having a fourth inner leg and a fourth outer leg, the second flange being formed by the second outer leg and the fourth outer leg, wherein a first inside surface of the first inner leg is positioned adjacent a third inside surface of the third inner leg, a second inside surface of the second inner leg is positioned adjacent a first outside surface of the first inner leg, and a fourth inside surface of the fourth inner leg is positioned adjacent a second outside surface of the second inner leg.

12. The corner support assembly of claim 11, wherein the first, second, third, and fourth inner legs include slots, the slots being at least partially aligned to form an aperture configured and arranged to receive a fastener.

13. The corner support assembly of claim 12, wherein the second and fourth inner legs are slidable relative to the first and third inner legs when the fastener is unsecured to allow movement of the second portion relative to the first portion.

14. A method of connecting veneer to a corner of a structure, comprising:

providing a veneer having an insulation thickness;
providing a corner support assembly, the corner support assembly comprising:
  a first portion having a first flange configured and arranged to be connected to a corner and a first leg extending from the first flange; and
  a second portion having a second flange and a second leg extending from the second flange, the second leg being directly slidably connected to the first leg, the second portion being configured and arranged to be adjustable relative to the first portion by moving the second leg relative to the first leg to vary a length formed by the first and second legs between the first and second flanges of the first and second portions to accommodate varying thicknesses of different types of insulation positioned between the first and second flanges;
connecting the first flange to the corner of the structure;
adjusting the distance between the first and second flanges to accommodate the insulation thickness;
positioning the insulation between the first and second flanges; and
connecting the second flange to the veneer.

15. The method of claim 14, further comprising securing the first and second portions with a fastener to fix the distance between the first and second flanges.

16. The method of claim 15, wherein at least one of the first and second legs includes a slot through which the fastener extends, further comprising loosening the fastener to slide at least one of the first and second legs relative to the other and then tightening the fastener to fix the distance between the first and second flanges.

* * * * *